(12) United States Patent
Meirav et al.

(10) Patent No.: US 9,933,320 B2
(45) Date of Patent: Apr. 3, 2018

(54) SYSTEMS, METHODS AND DEVICES FOR MEASUREMENT OF RATE OF HEAT EXCHANGE OF AIRFLOW SYSTEMS

(71) Applicant: ENVERID SYSTEMS, INC., Houston, TX (US)

(72) Inventors: Udi Meirav, Newton, MA (US); Israel Biran, Avihayil (IL); Tzvi Fisher, Kfar Sava (IL); Asael Meruham, Beit-dagan (IL)

(73) Assignee: ENVERID SYSTEMS, INC., Needham, MA (US)

( * ) Notice: Subject to any disclaimer, the term of this patent is extended or adjusted under 35 U.S.C. 154(b) by 371 days.

(21) Appl. No.: 14/775,500

(22) PCT Filed: Mar. 11, 2014

(86) PCT No.: PCT/US2014/023488
§ 371 (c)(1),
(2) Date: Sep. 11, 2015

(87) PCT Pub. No.: WO2014/164788
PCT Pub. Date: Oct. 9, 2014

(65) Prior Publication Data
US 2016/0025578 A1 Jan. 28, 2016

Related U.S. Application Data

(60) Provisional application No. 61/776,816, filed on Mar. 12, 2013.

(51) Int. Cl.
*G01K 17/06* (2006.01)
*G01K 17/10* (2006.01)

(52) U.S. Cl.
CPC ............. *G01K 17/06* (2013.01); *G01K 17/10* (2013.01)

(58) Field of Classification Search
CPC ............................... G01K 17/06; G01K 17/10
(Continued)

(56) References Cited

U.S. PATENT DOCUMENTS 5,675,979 A 10/1997 Shah
7,891,573 B2 2/2011 Finkam et al.
(Continued)

FOREIGN PATENT DOCUMENTS

WO  WO 2012/158911 A2  11/2012
WO  WO 2013/074973 A1  5/2013
WO  WO 2013/106573 A1  7/2013

OTHER PUBLICATIONS

International Search Report and Written Opinion, dated Jul. 10, 2014 for PCT International Application No. PCT/US2014/023488.

*Primary Examiner* — Bo Fan
(74) *Attorney, Agent, or Firm* — Cooley LLP

(57) ABSTRACT

Method, systems, and devices for determining instantaneous heat exchange between an airflow and a heat exchange element of an HVAC system are disclosed. In some embodiments, methods and systems include receiving or otherwise obtaining airflow data, temperature and humidity data. The airflow data may be used to calculate the volumetric airflow rate, and the temperature and humidity data may be processed with enthalpy data to determine the change in enthalpy (Δh) of the airflow after encountering a heat exchange element. The instantaneous rate of heat exchange (E) between the airflow and the heat exchange element may then be determined from the volumetric airflow rate and change in enthalpy.

20 Claims, 4 Drawing Sheets

(58) Field of Classification Search
USPC .......................................................... 702/127
See application file for complete search history.

(56) References Cited

U.S. PATENT DOCUMENTS

| 8,157,892 | B2 | 4/2012 | Meirav | |
|---|---|---|---|---|
| 2010/0262298 | A1 | 10/2010 | Johnson et al. | |
| 2011/0192172 | A1 | 8/2011 | Delacruz | |
| 2011/0198055 | A1* | 8/2011 | Meirav | B01D 53/0462 |
| | | | | 165/59 |
| 2012/0168113 | A1* | 7/2012 | Karamanos | F24F 1/0059 |
| | | | | 165/11.1 |

* cited by examiner

SYSTEMS, METHODS AND DEVICES FOR MEASUREMENT OF RATE OF HEAT EXCHANGE OF AIRFLOW SYSTEMS

CROSS-REFERENCE TO RELATED APPLICATIONS

This application is a 35 U.S.C. § 371 national stage entry of PCT/US2014/023488, which claims priority to U.S. Provisional Patent Application No. 61/776,816, filed Mar. 12, 2013, and entitled "Device and Method for Measurement of Energy Consumption of Systems with Flowing Air", the disclosure of which is incorporated herein by reference in its entirety.

TECHNICAL FIELD

Embodiments of the present disclosure generally relate to systems, methods and devices for the measurement of a rate of heat exchange in airflow systems, such as Heating, Ventilation and Air-Conditioning (HVAC) systems.

BACKGROUND

HVAC systems generally receive an air stream and condition the air, which can include changing its temperature and/or humidity, for example. The process invariably consumes energy, and the rate of energy consumption can change all the time due to numerous factors. It is desirable to be able to determine the instantaneous rate of heat exchange, or thermal load, between the air stream and the HVAC system.

Metering the electric power input into the HVAC system is not always feasible, and even when it is, it does not always provide a satisfactory measure of the instantaneous energy dissipation associated with the air itself, especially when the HVAC system has separate components for mechanical control of air flow and for chilling or heating heat exchange elements, or when some of the components are shared across several separate units. At the same time, an accurate determination of instantaneous thermal load can be instrumental in diagnosing waste, improving efficiency and also being able to correctly attribute efficiency gains to their true cause or enabler. A tool that could directly, and reliably, determine the thermal load from the air stream itself, can be a very effective means to diagnose HVAC energy efficiency, identify potential improvements, and confirm the performance and value of such improvements.

SUMMARY OF DISCLOSURE

Some embodiments of the disclosure provide systems, methods and devices that combine real-time measurements during flow of a stream of air (which may be referred to as an "airflow" or as an air stream, the term and phrase used interchangeably throughout), that are relatively easy, practical and accurate, with precise parametric calculations, for reliably determining the instantaneous airflow and heat exchange rate experienced by the air stream.

In some embodiments, a method (which may be computer implemented) for determining instantaneous heat exchange between an airflow and a heat exchange element of an HVAC system is provided. The method may comprise receiving (or otherwise obtaining, both terms used interchangeably throughout the disclosure) airflow data corresponding to at least one of a velocity, and static pressure of an airflow over and/or through a heat exchange element of a specified HVAC system or airflow data corresponding to a fan power of a fan within the HVAC system. The method may include receiving first temperature and first humidity level data of the airflow prior to encountering the heat exchange element, second temperature and second humidity level data of the airflow after encountering the heat exchange element. The method may further comprise accessing at least one database having stored thereon at least enthalpy data for a plurality of temperatures and humidity levels, processing at least one of the velocity, static pressure and fan power signals and/or data corresponding thereto and determining a volumetric airflow rate (Q) of the airflow. The method may further comprise processing at least some of the temperature and humidity data with enthalpy data to determine the change in enthalpy ($\Delta h$) of the airflow after encountering the heat exchange element, and determining an instantaneous rate of heat exchange (E) between the airflow and the heat exchange element from the determined volumetric airflow rate and change in enthalpy.

In some embodiments, the method may further comprise outputting at least the determined instantaneous heat exchange between the airflow and the heat exchange element to at least one of a database, a display, a computer, a server, a printer, and a mobile device. In some embodiments, at least one of the receiving, accessing, processing and determining steps are carried out substantially in real-time. In some embodiments, a plurality of the receiving, accessing, processing and determining steps are carried out substantially in real-time. In some embodiments, receiving, accessing, processing and determining steps are carried out substantially in real-time.

In some embodiments, receiving comprises receiving the data via at least one of wired or wireless communication. The airflow data may comprise an instantaneous reading of at least one of the velocity and static pressure. The method may be performed by at least one processor. In some embodiments, the processor may be remote from the HVAC system. The data stored on the database may include performance properties of the fan or a blower of the HVAC system. In some embodiments, the performance properties of the fan or blower may comprise a characteristic pressure-volumetric airflow rate curve of the fan or blower.

In some embodiments, the data stored on the database includes parameters for converting at least one of velocity and static pressure data to a volumetric flow rate specific to the HVAC system. In some embodiments, the data stored on the database includes historical data including at least one of weather, energy consumption, system operation, and system performance associated with the HVAC system.

In some embodiments, a non-transitory computer readable medium is provided having stored thereon at least one of an application program and computer instructions operational on one or more processors for performing a computer implemented method for determining instantaneous heat exchange between an airflow and a heat exchange element of an HVAC system comprising receiving airflow data corresponding to at least one of a velocity and static pressure of an airflow over and/or through a heat exchange element of a specified HVAC system or airflow data corresponding to a fan power of a fan within the HVAC. The method may include receiving first temperature and first humidity level data of the airflow prior to encountering the heat exchange element and receiving second temperature and second humidity level data of the airflow after encountering the heat exchange element. The method may include accessing at least one database having stored thereon at least enthalpy data for a plurality of temperatures and humidity levels, processing at least one of the velocity, static pressure and fan power signals and/or data corresponding thereto and determining a volumetric airflow rate (Q) of the airflow, processing at least some of the temperature and humidity data with enthalpy data to determine the change in enthalpy (Δh) of the airflow after encountering the heat exchange element and determining an instantaneous rate of heat exchange (E) between the airflow and the heat exchange element from the determined volumetric airflow rate and change in enthalpy.

In some embodiments, a system for determining instantaneous heat exchange between an airflow and a heat exchange element of an HVAC system is provided, the system comprising an HVAC system. The HVAC system may comprise an air handling unit configured to receive and effect heat exchange via a heat exchange element on an airflow at least partially received from an interior space and return the airflow after heat exchange to the interior space. The HVAC system may comprise the heat exchange element, at least one airflow sensor arranged proximate the heat exchange element and configured to generate at least one of a velocity and static pressure signal determinative of at least one of a velocity and static pressure, respectively, of an airflow over and/or through the heat exchange element, a first temperature sensor and a first humidity sensor arranged proximate the heat exchange element on an upstream side thereof, each sensor configured to generate respective first signals determinative of a temperature and a humidity level, respectively, of the airflow prior to encountering the heat exchange element, a second temperature sensor and a second humidity sensor arranged proximate the heat exchange element on a downstream side thereof, each sensor configured to generate respective second signals determinative of a temperature and a humidity level, respectively, of an airflow after encountering the heat exchange element. At least one database may have stored thereon at least enthalpy data for a plurality of temperatures and humidity levels. At least one computer processor may be configured to receive the airflow, temperature and humidity signals generated by the sensors and/or data corresponding thereto, access the at least one database, with computer instructions operational thereon for processing at least one of the velocity and static pressure signals and/or data corresponding thereto thereby determining a volumetric airflow rate (Q) of the airflow, processing the temperature and humidity signals and/or data corresponding thereto with data from the database thereby determining a change in enthalpy (Δh) of the airflow after encountering the heat exchange element and determining the instantaneous rate of heat exchange (E) between the airflow and the heat exchange element.

In some embodiments, the computer instructions may be further operational to output at least the determined instantaneous heat exchange between the airflow and the heat exchange element to at least one of a database, a display, a computer, a server, a printer, and a mobile device. In some embodiments, the computer instructions may be operational to carry out at least one of receiving, accessing, processing and determining, substantially in real-time. In some embodiments, the computer instructions may be operational to carry out a plurality of receiving, accessing, processing and determining, substantially in real-time. In some embodiments, the computer instructions are operational for receiving, accessing, processing and determining, substantially in real-time.

In some embodiments, at least one signal generated from the air flow sensor comprises an instantaneous reading of the velocity and/or static pressure. The sensors may be configured to provide the generated signals via at least one of wire or wireless communications to the processor or to an intermediary computer or a communication device in communication with the processor. The processor may comprise at least one remote computer.

In some embodiments, the HVAC system may include a blower or a fan, and wherein the data stored on the database includes performance properties of the blower or the fan. In some embodiments, the performance properties of the fan or blower may comprise a characteristic pressure-volumetric airflow rate curve of the fan or blower. In some embodiments, the data stored on the at least one database includes parameters for converting at least one of velocity and static pressure sensor signals to a volumetric flow rate specific to the HVAC system. In some embodiments, the data stored on the database includes historical data including at least one of weather, energy consumption, system operation, and system performance associated with the HVAC system.

In some embodiments, a system for determining instantaneous heat exchange between an airflow and a heat exchange element of an HVAC system is provided, the system comprising an HVAC system. The HVAC system may comprise an air handling unit configured to receive and effect heat exchange via a heat exchange element on an airflow at least partially received from an interior space and return the airflow, after heat exchange, to the interior space. The HVAC system may comprise the heat exchange element, at least one airflow sensor arranged proximate the heat exchange element and configured to generate at least one of a velocity and static pressure signal determinative of at least one of a velocity and static pressure, respectively, of an airflow over and/or through the heat exchange element, a first temperature sensor and a first humidity sensor arranged proximate the heat exchange element on an upstream side thereof, each sensor configured to generate respective first signals determinative of a temperature and a humidity level, respectively, of the airflow prior to encountering the heat exchange element, a second temperature sensor and a second humidity sensor arranged proximate the heat exchange element on a downstream side thereof, each sensor configured to generate respective second signals determinative of a temperature and a humidity level, respectively, of an airflow after encountering the heat exchange element, at least one database having stored thereon at least enthalpy data for a plurality of temperatures and humidity levels and at least one computer processor. The system may be configured to determine an instantaneous heat exchange between the airflow and the heat exchange element based on the information provided by the sensors.

In some embodiments, the determination of the instantaneous heat exchange is carried out substantially in real-time.

In some embodiments, an HVAC system is provided comprising an air handling unit configured to receive and effect heat exchange via a heat exchange element on an airflow at least partially received from an interior space and return the airflow after heat exchange to the interior space, the heat exchange element, at least one airflow sensor arranged proximate the heat exchange element and configured to generate at least one of a velocity and static pressure signal determinative of at least one of a velocity and static pressure, respectively, of an airflow over and/or through the heat exchange element, a first temperature sensor and a first humidity sensor arranged proximate the heat exchange element on an upstream side thereof, each sensor configured to generate respective first signals determinative of a temperature and a humidity level, respectively, of the airflow prior to encountering the heat exchange element. and a second temperature sensor and a second humidity sensor arranged proximate the heat exchange element on a downstream side thereof, each sensor configured to generate respective second signals determinative of a temperature and a humidity level, respectively, of an airflow after encountering the heat exchange element, The HVAC system may be configured to at least provide airflow information of an airflow proximate the heat exchange element, and a plurality of temperature and humidity levels. In some embodiments, the information may be provided substantially in real-time.

In some embodiments, an HVAC system is provided comprising an air handling unit configured to receive and effect heat exchange via a heat exchange element on an airflow at least partially received from an interior space and return the airflow after heat exchange to the interior space, the heat exchange element, at least one of an airflow sensor arranged proximate the heat exchange element and configured to generate at least one of a velocity and static pressure signal determinative of at least one of a velocity and static pressure, respectively, of an airflow over and/or through the heat exchange element, or a fan proximate the heat exchange element for directing the airflow to the heat exchange element. The HVAC system may further comprise a first temperature sensor and a first humidity sensor arranged proximate the heat exchange element on an upstream side thereof, each sensor configured to generate respective first signals determinative of a temperature and a humidity level, respectively, of the airflow prior to encountering the heat exchange element. The HVAC system may be configured to at least provide airflow information of airflow proximate the heat exchange element, and at least one temperature and humidity level.

In some embodiments, the system may comprise a second temperature sensor and a second humidity sensor arranged proximate the heat exchange element on a downstream side thereof, each sensor configured to generate respective second signals determinative of a temperature and a humidity level, respectively, of an airflow after encountering the heat exchange element. In some embodiments, a power of the fan may be determinative of a volumetric airflow rate (Q) of the airflow.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The principles and operations of the systems, apparatuses and methods according to some embodiments of the present disclosure may be better understood with reference to the drawings, and the following description. The drawings are given for illustrative purposes only and are not meant to be limiting.

DETAILED DESCRIPTION

Figure 1:
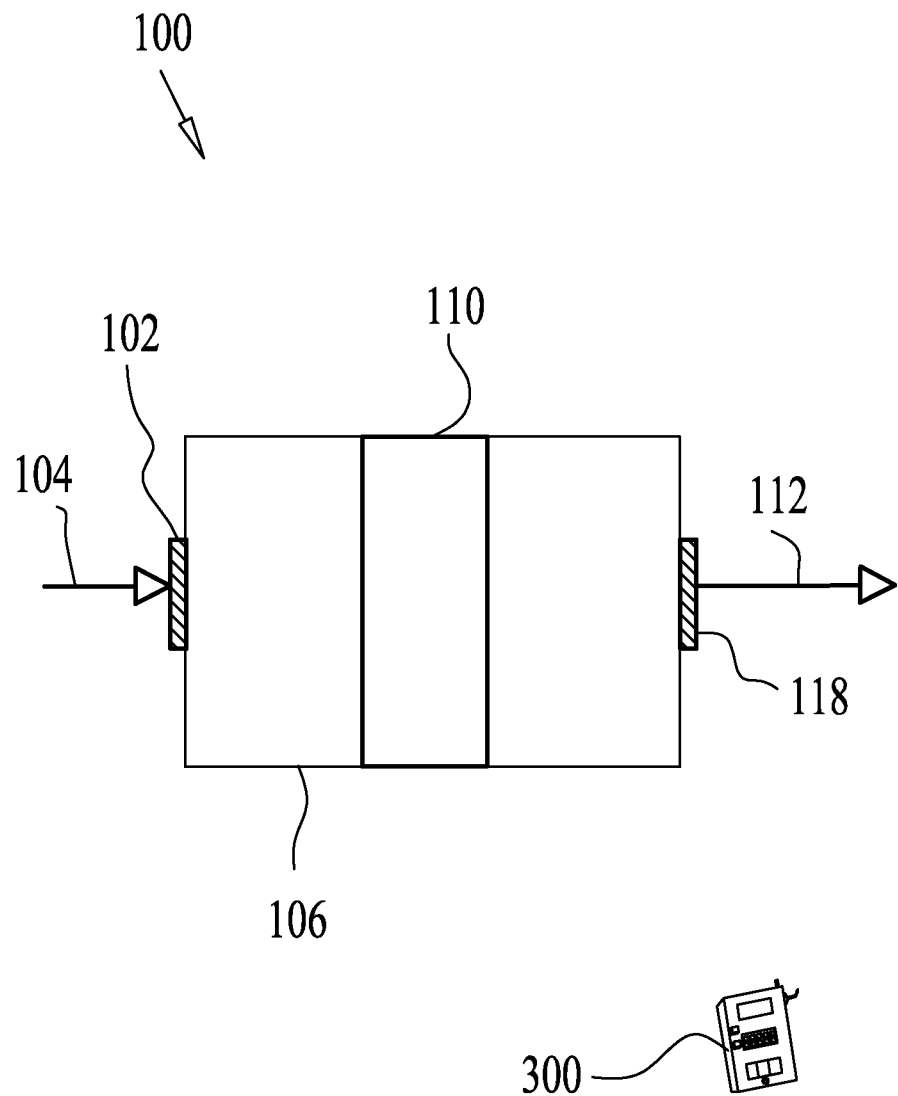
FIG. 1 is a schematic illustration of an exemplary airflow system, according to some embodiments of the present disclosure.
Figure 2:
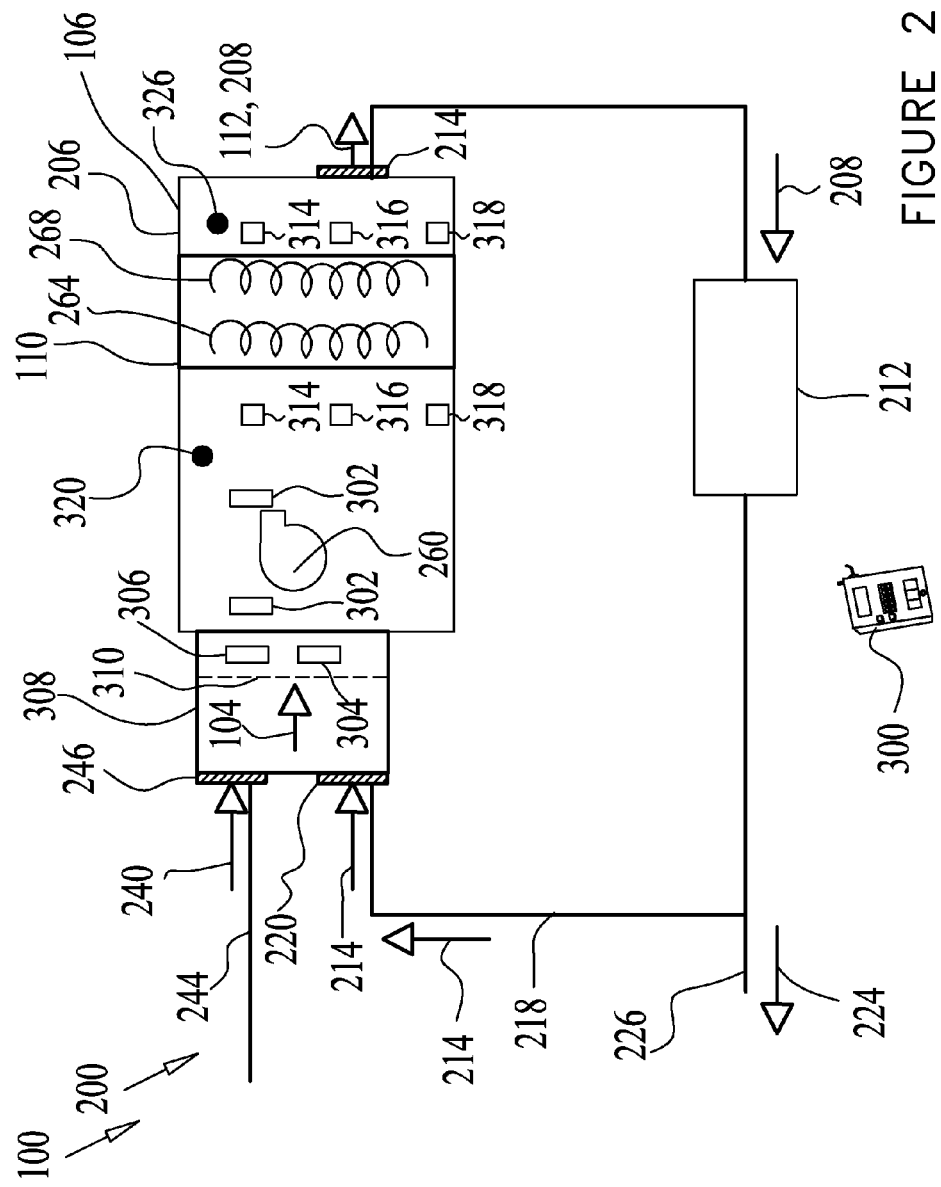
FIG. 2 is a schematic illustration of an exemplary airflow system, according to some embodiments of the present disclosure.

FIGS. 1 and 2 are each a schematic illustration of an exemplary airflow system, according to some embodiments of the present disclosure. As seen in FIG. 1, an airflow system 100 comprises an air inlet 102 for flow of incoming air 104 from any location into an air management unit 106. The air management unit 106 can comprise a heat exchange element 110. The heat exchange element 110 can be configured to condition the incoming air 104 by changing its properties, such as temperature and/or humidity, for example. The now conditioned outgoing air 112 may flow out of the air management unit 106, via an air outlet 118 to any desired location.

The heat exchange element 110 can comprise any suitable element for conditioning the incoming air 104. In some embodiments, conditioning the incoming air 104 can comprise exchanging heat between the incoming air 104 and the heat exchange element 110. The rate of heat exchange, from an engineering perspective of the air management unit 106, may be referred to as a cooling load or a heating load, and collectively as a thermal load. In some embodiments, during the heat exchange, heat is transferred from the incoming air 104 to heat exchange element 110, resulting in outgoing air 112 cooler than the incoming air 104, and a cooling load on the heat exchange element 110. In some embodiments, during the heat exchange, the incoming air 104 is heated by the heat exchange element 110 by transferring heat to the incoming air 102, resulting in outgoing air 112 hotter than the incoming air 104 and a heating load on the heat exchange element 110.

An exemplary airflow system 100 is shown in FIG. 2, where the airflow system 100 comprises a Heating, Ventilation and Air Conditioning (HVAC) system 200. The HVAC system 200 may include the air management unit 106, comprising an air handling unit 206. The air handling unit 206 may comprise any suitable configuration for selectively conditioning supply air 208 exiting air handling unit 206, via an outlet 214, and introduced in an interior space 212. The air handling unit 206 may be further configured to receive and effect heat exchange via the heat exchange element 110 on the airflow, at least partially received from the interior space 212, and return the airflow, after heat exchange, to the interior space 212.

The interior space 212 may be an office building, a commercial building, a bank, a residential building, a house, a school, a factory, a hospital, a store, a mall, an indoor entertainment venue, a storage facility, a laboratory, a vehicle, an aircraft, a ship, a bus, a theatre, a partially and/or fully enclosed arena, an education facility, a library and/or other partially and/or fully enclosed structure and/or facility which can be at times occupied by equipment, materials, live occupants (e.g., humans, animals, synthetic organisms, etc.), etc., and/or any combination thereof.

Return air 214, that is, indoor air exiting the interior space 212, may exit via conduits 218.

In some embodiments, the return air 214 may be partially reintroduced into the air handling unit 206, at an inlet 220, and may be partially exhausted into the outside atmosphere, or any other environment. The exhausted air 224 may egress the HVAC system 200 in any suitable manner, such as via exhaust ducts 226.

In some embodiments, all the return air 214 may be reintroduced into the air handling unit 206, at inlet 220. In some embodiments, all the return air 214 may be exhausted to the outside atmosphere, or any other environment. The volume of the portion of return air 214 flowing into the HVAC system 200 may be controlled by a damper (not shown) and/or a fan, or by any other suitable means.

A portion of fresh, outdoor air 240, may be introduced into the HVAC system 200 via intake ducts 244 and an inlet 246 for temperature adjustment thereof prior to introduction into the interior space 212 as supply air 208. The volume of the portion of outdoor air 240 flowing into the HVAC system 200 may be controlled by a damper (not shown) and/or a fan, or by any other suitable means.

In some embodiments, when the return air 214 may be partially reintroduced into the air handling unit 206, the incoming air 104 into the air handling unit 206 may comprise return air 214 and outdoor air 240. In some embodiments, when no outdoor air 240 is introduced into the air handling unit 206, the incoming air 104 may comprise return air 214 only or a minimal volume of outdoor air 240. In some embodiments, the incoming air 104 may comprise outdoor air 240.

In some embodiments, the air handling unit 206 may comprise a plurality or single air handling fan 260 for directing the incoming air 104 to flow over and/or through (over and/or through may collectively be referred to as "through") the heat exchange element 110 and there-out as outgoing air 112. The fan 260 may be placed upstream or downstream from the heat exchange element 110. The outgoing air 112 may be provided to the interior space 212 as the supply air 208. In some embodiments, heat exchange element 110 within the air handling unit 206 may comprise a cooling coil 264 for receiving the cooling load from the incoming air 104. In some embodiments, in addition to the cooling coil 264 or in place thereof, there may be provided a heating coil 268 for receiving the heating load from the incoming air 104 by heating the incoming air 104.

In accordance with some embodiments, a filter, scrubber, or a passive or active catalytic element (not shown) may be provided to reduce the concentration of contaminants present in the return air 214 prior to being supplied as supply air 208 to the interior space 212.

Figure 3:
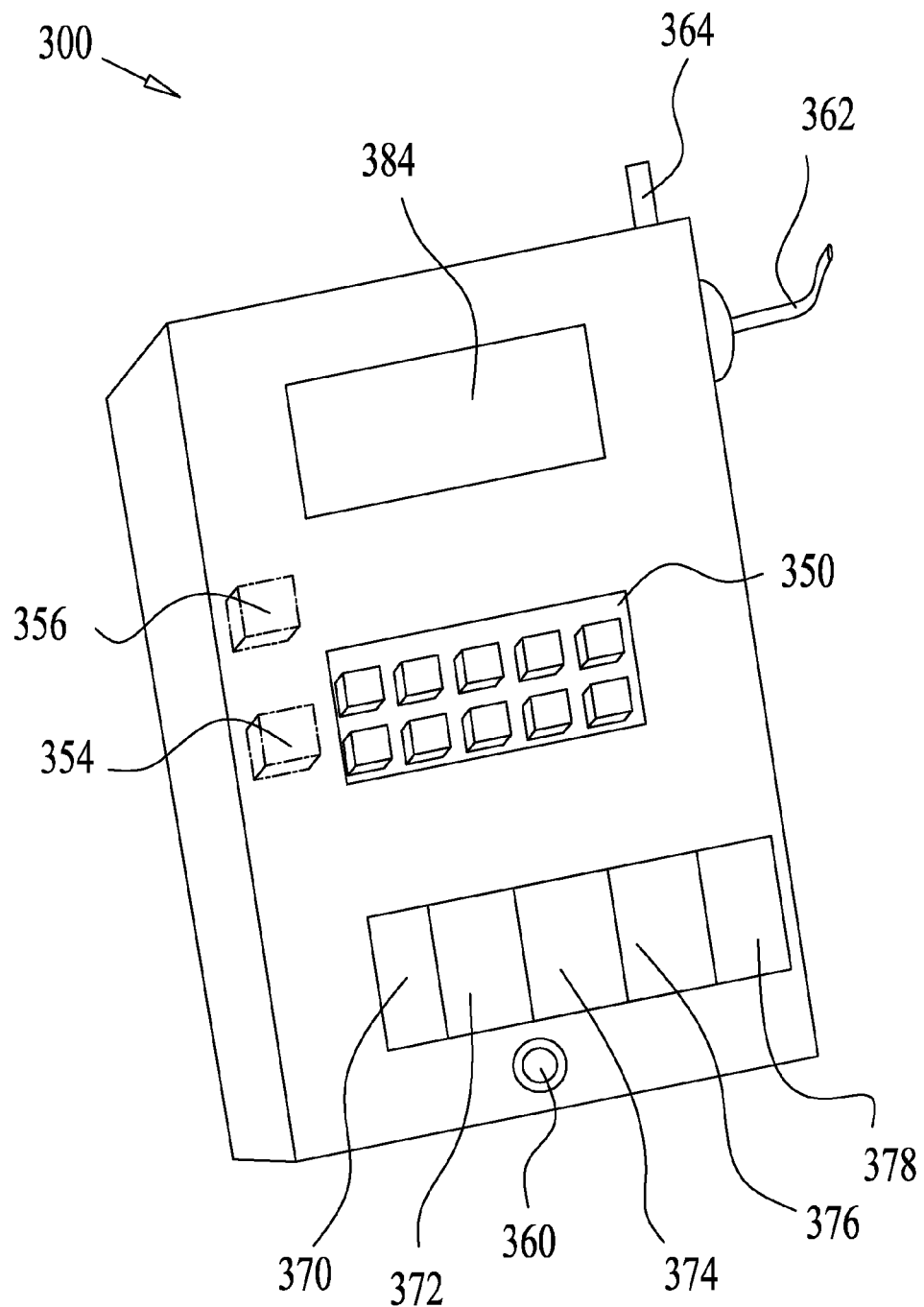
FIG. 3 is a schematic illustration of an exemplary device for measuring a thermal load in an airflow system, according to some embodiments of the present disclosure.

In accordance with an embodiment of the present disclosure, a method and a device may be provided for measuring the thermal load, or rate of heat exchange or transfer, between the incoming air 104 and the heat exchange element 110. This may be performed by any suitable method for measuring a thermal load. An exemplary device 300 is shown in FIG. 3.

In accordance with some embodiments, the thermal load may be determined according to the formula: $E=Q \times \Delta h$, which expresses the rate of heat exchange, E, between an air stream and a heat exchange element wherein:

Q is the volumetric airflow rate.

h is the volume-specific enthalpy of the air, and $\Delta h = h_{in} - h_{out}$ represents the difference in specific enthalpy between the incoming air $h_{in}$ and the outgoing air $h_{out}$. Incoming and outgoing locations may be measured relative to the heat exchange element 110 of the airflow system 100. In the embodiment of FIGS. 1 and 2, the $h_{in}$ denotes the specific enthalpy of the incoming air 104 and $h_{out}$ denotes the specific enthalpy of the outgoing air 112.

The volumetric airflow rate Q may be determined in any suitable manner.

In one embodiment, the volumetric airflow rate Q may be directly measured by a volumetric airflow rate meter or sensor. In some embodiments the volumetric airflow rate sensor may be incorporated in the device 300, as will be shown in FIG. 3. In some embodiments, the volumetric airflow rate sensor may be separate from the device 300, such as a volumetric airflow rate sensor 304 incorporated in the air management unit 206 at any suitable location, such as prior to the fan 260. The volumetric airflow rate sensor 304 may generate a signal determinative of the measured volumetric airflow rate Q, which may be transmitted to the device 300 in any suitable manner.

In some embodiments, such as HVAC systems 200, the air flow may be variable. Therefore, the volumetric airflow rate Q may change during flow. The volumetric airflow rate Q changes lead to changes in incoming air specific enthalpy $h_{in}$ and outgoing air specific enthalpy $h_{out}$. This can be, for example, since the incoming air 104 may be a mix of return air 214 and outdoor air 240 or because the heat exchange rate itself decreases as the air flow velocity increases.

Therefore, according to some embodiments, there is provided a method for indirectly determining the volumetric airflow rate Q.

In some embodiments, the volumetric airflow rate Q may be determined based on performance properties of the fan 260.

In some embodiments, this indirect method may employ a characteristic pressure-flow curve of the fan 260. The characteristic pressure-flow curve may be based on a characteristic function $Q(\Delta P)$ of the fan 260. Generally, the fan 260 has a characteristic function $Q(\Delta P)$ relating volumetric airflow rate Q to the pressure difference $\Delta P$ between the incoming air 104 and outgoing air 112 in the vicinity of the fan 260. In some embodiments, the characteristic pressure-flow curve may be dependent on the geometrical features of the fan 260, such as the fan blade structure and number of blades, for example.

Differential pressure $\Delta P$ is relatively easy and inexpensive to measure with high accuracy. Thus, by storing the known characteristic function $Q(\Delta P)$ of fan 260 in any suitable manner, and installing pressure sensors 302 before and after the fan 260, the device 300 can accurately determine the volumetric airflow rate Q. In some embodiments, the instantaneous volumetric airflow rate may be determined. Instantaneous volumetric airflow rate may include the volumetric airflow rate at a desired moment. In some embodiments, the volumetric airflow rate over a relatively extended time period may be determined.

Throughout the present disclosure the term pressure may also indicate the static pressure.

The characteristic function $Q(\Delta P)$ may be determined in any suitable manner, such as empirically. The characteristic function $Q(\Delta P)$ or the resultant pressure-flow curve, may be stored in any suitable manner, such as in a computing system and/or the device 300. In some embodiments, the characteristic function $Q(\Delta P)$ or pressure-flow curve may be provided by the manufacturer or may be provided by any other source.

In some embodiments, the volumetric airflow rate Q may be approximately determined as: $Q = A \times V$, wherein A is a cross sectional area of a conduit where the air flows and V is the velocity of the airflow.

In one embodiment, the velocity V may be directly measured by a velocity meter or a velocity sensor. In some embodiments, the velocity sensor may be incorporated in the device 300, as will be shown in FIG. 3. In some embodiments, the velocity sensor may be separate from the device 300, such as a velocity sensor 306 incorporated in the air management unit 206 at any suitable location, such as prior to the fan 260. The velocity sensor 306 may generate a signal determinative of the measured velocity V, which may be transmitted to the device 300 in any suitable manner.

In some embodiments, such as in HVAC systems 200, the air flow velocity may not be uniform across the entire cross section of the conduit where the velocity is being measured. In some embodiments, the area A may comprise a cross section of a conduit 308 leading the incoming air 104 to the air handling unit 206. The conduit 308 cross section is shown by dashed line 310.

Therefore, according to some embodiments, there is provided a method for mapping the locally measured air velocity V to a volumetric airflow rate Q in any suitable manner, such as empirically. In some embodiments, for example, the velocity mapping may be performed by measuring the velocity of the air stream at different settings of fan 260 or different operational modes of the air handling unit 206. In a case wherein the volumetric airflow rate Q is known for each fan setting or different operational modes of the air handling unit 206, a V per Q conversion table of measured velocities V per corresponding volumetric airflow rates Q may be established. With the aid of the V per Q conversion table, future measured velocities may be used to indicate an unknown volumetric airflow rate Q. Moreover, the V per Q conversion table may be used to extrapolate or interpolate the volumetric airflow rate Q, based on a measured velocity V.

For example, the mapping may be performed by initially placing a velocity sensor 306 in proximity to inlet 214. The fan 260 may be operated at three settings where in each setting the volumetric airflow rates, $Q_1$, $Q_2$ and $Q_3$ are known. At each fan setting the corresponding velocities are measured and the velocity measurements $V_1$, $V_2$ and $V_3$ are stored. Accordingly, a V per Q conversion table is established and stored. This resultant non-linear calibration can be quantified and stored in any suitable manner, such as in a computing system and/or device 300. Based on the stored V per Q conversion table, future velocity measurements by the velocity sensor, may be used to determine the corresponding volumetric airflow rate Q, such as by matching the measured velocity to the corresponding volumetric airflow rate, or by extrapolation or interpolation. In some embodiments, a computing device and/or device 300 may perform matching the measured velocity to the corresponding volumetric airflow rate or perform the extrapolation or interpolation, generally based on more than a single velocity measurement.

In some embodiments the volumetric airflow rates, $Q_1$, $Q_2$ and $Q_3$ may be known in any suitable manner, such as by using the characteristic function $Q(\Delta P)$, described herein.

In some embodiments, the V per Q conversion table may be further used to establish a velocity V per area A conversion table. Using the relationship $Q = A \times V$, and assuming that during establishment of the V per Q conversion table, the air flow velocity V is uniform across the entire area A, then the area A may be represented by Q/V. A conversion table of the velocity V per area A, represented by Q/V, may be determined. Accordingly, future velocity measurements by the velocity sensor, may be used to determine the corresponding resultant area A (i.e. Q/V), such as by matching the measured velocity to the corresponding resultant area in the velocity V per area A conversion table, or by extrapolation or interpolation. In some embodiments, a computing device and/or device 300 may perform matching the measured velocity to the corresponding resultant area or perform the extrapolation or interpolation, generally based on more than a single velocity measurement.

In some embodiments, the area A may be a predetermined property provided by the manufacturer of the air management unit 106. In some embodiments, the area A may be determined by the device 300 in any suitable manner. Measurement of the area of cross section 310 may be performed in any suitable manner, such as by manually measuring the length or diameter of the area A and entering the measurement into the device 300 in any suitable manner. Alternatively, the measurement may be performed by imaging the area A, such as by a camera. The image may be analyzed by a processor to determine the area A.

The air handling unit 206 may comprise a blower for driving the incoming air 104 into the air handling unit 206 or other additional components. In some embodiments, a characteristic function $Q(\Delta P)$ of the blower or a V per Q conversion table or velocity V per area A conversion table of the blower or other components, may be determined and used to determine the volumetric airflow rate Q.

In some embodiments, the volumetric airflow rate Q may be determined by the power consumption of the fan 260. The fan power may indicate the volumetric airflow rate. For example, for a fan with an "on" and "off" setting, the predetermined volumetric airflow rate during operation of the fan 260 is provided by the manufacturer or may be measured. For a variable speed fan, the fan power may indicate the volumetric airflow rate.

Determination of the thermal load may comprise the enthalpy differential $\Delta h$ measured at any two locations in the airflow system 100. In some embodiments, the enthalpy difference may be determined by determining the enthalpy of the incoming air 104 and the enthalpy of the outgoing air 112.

In some embodiments, determination of the enthalpy may be performed by an enthalpy sensor. The enthalpy sensor may be incorporated in the device 300. In some embodiments, an enthalpy sensor 314 may be incorporated in the air management unit 206 at any suitable location such as before the heat exchange element 110, on an upstream side thereof, for detecting $h_{in}$ and after the heat exchange element 110, on a downstream side thereof, for detecting $h_{out}$. A signal indicative of the detected enthalpies $h_{in}$ and/or $h_{out}$ may be transmitted to the computing system and/or device 300 in any suitable manner.

In some embodiments, the enthalpy may be determined by an algorithm known in the art comprising the temperature T of the airflow and the relative humidity H of the airflow. An example of such an algorithm may comprise psychrometric charts. In some embodiments, a wet bulb temperature of the airflow may be measured and the air enthalpy h may be determined by any suitable algorithm, such as an algorithm comprising psychrometric charts.

The temperature T of the airflow may be determined in any suitable manner, such as by a temperature sensor. In some embodiments, the temperature sensor may be incorporated in the device 300, as will be shown in FIG. 3. In some embodiments, a temperature sensor 316 may be incorporated in the air management unit 206 at any suitable location, such as before the heat exchange element 110, for detecting the temperature of the incoming air 104, and after the heat exchange element 110, for detecting the temperature of the outgoing air 112. A signal indicative of the detected temperatures may be transmitted to the computing system and/or device 300 in any suitable manner.

In some embodiments, the temperature of the airflow may be measured at any suitable location out of the air management unit 206, such as in proximity to the inlet 102 and/or outlet 118, such as by a temperature sensor of the device 300.

The relative humidity H of the airflow may be determined in any suitable manner, such as by a humidity sensor. In some embodiments, the humidity sensor may be incorporated in the device 300, as will be shown in FIG. 3. In some embodiments, a humidity sensor 318 may be incorporated in the air management unit 206 at any suitable location, such as before the heat exchange element 110, for detecting the humidity of the incoming air 104, and after the heat exchange element 110, for detecting the humidity of the outgoing air 112. A signal indicative of the detected humidity may be transmitted to the computing system and/or device 300 in any suitable manner.

In some embodiments, the humidity of the airflow may be measured at any suitable location, out of the air management unit 206, such as in proximity to the inlet 102 and/or outlet 118, such as by a humidity sensor of the device 300.

In some embodiments, the enthalpy sensor 314 may be incorporated in the air management unit 206 before the heat exchange element 110, for detecting $h_{in}$. The enthalpy after the heat exchange element 110, $h_{out}$, may be estimated based on the enthalpy before encountering the heat exchange element 110, $h_{in}$, and other properties of the air handling unit 206. The properties of the air handling unit 206 may include a temperature setting of the heat exchange element 110, such as coils 264 and/or 268, size of the coil 264 and/or 268, and design (e.g. size, volume) of the air handling unit 206. A signal indicative of the detected enthalpies $h_{in}$ and/or $h_{out}$ may be transmitted to the computing system and/or device 300 in any suitable manner.

Following determination of the volumetric airflow rate Q and enthalpy differential Δh, or any other data, the thermal load (i.e. rate of heat exchange) on the heat exchange element 110 may be determined by the computing system and/or device 300. The determined thermal load may be stored in a data storage system, such as a memory associated with a processor, in the device 300. Alternatively, the determined thermal load may be stored in a data storage system using any suitable storage functionality in the vicinity of the airflow system 100 or remotely therefrom. The thermal load may be transmitted by transmission functionality in any suitable manner, such as being manually entered or automatically over a wireless or wireline network, for example. Examples of a wireless or wireline network may be standard public wireline networks, public wireless networks, such as cellular phone networks, WiFi, Bluetooth, satellite, the internet, or any specialized or proprietary communications network.

The thermal load may be further processed. For example, the thermal load may be normalized and presented as a value of thermal load per predetermined unit, such as the thermal load per year, thermal load per month or thermal load per day or thermal load per volume of air.

In some embodiments, the computing system and/or device 300 may receive additional external data used to determine the thermal load, such as data related to the location of the air management unit 106, such as the location of the air management unit 106 within the interior space 212, such as a building or enclosed space, e.g. the floor or side of the building or enclosed space. Additionally, the geographical location of the interior space 212 may be provided to the device 300 or any other related data. The data may be transmitted to the computing system and/or device 300 in any suitable manner, such as by being manually entered or automatically by connecting to the internet or any other database, for example.

In some embodiments, the computing system and/or device 300 may receive additional external data used in an algorithm for determining the thermal load. For example, the external data may comprise current or historical weather conditions, which may be used, for determining the relative humidity, for example. The external data may be transmitted to the computing system and/or device 300 from remote databases, internet, weather stations or any other suitable database. In other embodiments the data can comprise the parameters that characterize the fan 260 in FIG. 2 or the geometric properties of the air management unit 106 or air handling unit 206. In some embodiments, the data can comprise the energy consumption of components in the HVAC system 200, such as the energy consumption of the fan 260, heat exchange element 110, blowers and chillers, for example. In some embodiments, the data can comprise the thermal load on other components in the HVAC system 200, such as the thermal load on the fan 260, blowers or chillers, for example.

The collection of such data may be valuable for analyzing patterns, comparison of different systems, buildings, cities, types of air management devices, trends and influences related to energy consumption or air quality. Furthermore collection of such data may be analyzed to achieve improved energy and thermal load utilization practices, evaluate new technologies or products, and support commercial, social or scientific goals, for example. The collection of such data may be valuable for any commercial purpose.

In some embodiments, the device 300 may be a separate, standalone device, such as a mobile or handheld electronic device, a computer, a cellular phone, smartphone, or a tablet. In some embodiments, the device may be incorporated within the air management unit 106 or within any other element of the airflow system 100 within the air handling unit 206 or within any other element of the HVAC system 200.

In some embodiments, the device 300 or computing system may include a non-transitory computer readable medium having stored thereon at least one of an application program and computer instructions operational on one or more processors for performing a computer implemented method for determining instantaneous heat exchange between the airflow and the heat exchange element 110.

The airflow system 100, such as the HVAC system 200, may comprise a control unit for controlling the operation of the air management unit 106, such as the air handling unit 206. In some embodiments, the device 300 may be controlled by this control unit.

In some embodiments, the sensors, such as the volumetric airflow rate Q sensor, velocity V sensor, pressure P sensor, temperature T sensor and relative humidity H sensor, and the area A calculator, may be placed at different locations within the airflow system 100 and the output of the sensors and calculators may be transmitted to a processor, in any suitable manner. The processor may be configured to determine the thermal load from the received sensor and calculator output. The processor may be located within the computing system and/or device 300 or any suitable location within the airflow system 100 or remotely therefrom.

Turning to FIG. 3, an exemplary device 300 is shown, it being appreciated that a device for thermal load measurement of the airflow may be designed in any suitable manner. The device 300 shown in FIG. 3 is a hand held, portable device. The device 300 may comprise any suitable input module, such as a keypad 350 for entering data, such as the model of the air handling unit 206, for example. The data may be stored within storage functionality, such as a memory 354 and processed by a processor 356. In some embodiments, for example, the model of the air handling unit 206 may be used to provide the model of fan 260. The processor 356 may retrieve the characteristic function Q(ΔP) from memory 354, so as to determine the volumetric airflow rate Q, as described above.

The memory 354 may further store additional information, for example, psychrometric charts, unit conversion tables, locally measured air velocity maps, or any other information employed for determining the thermal load.

Additionally, the memory 354 may store a correlation between an air property or air flow and the volumetric airflow rate Q. This correlation may include characteristic functions, such as the characteristic function Q(ΔP), or characteristic curves such as the pressure-flow curve, or conversion tables, such as the V per Q conversion table or the velocity V per area A conversion table. The correlation may be stored in any suitable form, such as a curve, function, series of numbers, map, conversion table or graph, for example.

The memory 354 can be configured for storing an algorithm for determining the thermal load based on the air flow property. The algorithm may comprise E=Q×Δh, described above.

In some embodiments, the stored data may include performance properties of the fan 260 or a blower that drives the airflow.

A camera 360 may be provided to image an area, such as the area A of the air handling unit 206 for analyzing the image by the processor 356 to determine a desired area.

Additional data may be transmitted to the device 300 via wired communication means 362 or wireless communication means 364. For example, the relative humidity of outdoor air 240 (FIG. 2), may be transmitted via wireless communication means 364 to the device 300 or external signals may be received by the wired communication means 362 or wireless communication means 364, such as signals from pressure sensors 302 of FIG. 2, for example.

The device 300 may comprise sensors for measuring air properties of the airflow, such as for example, a temperature T sensor 370, a humidity H sensor 372, and a pressure sensor 374. The device 300 may comprise sensors for measuring air flow, such as a volumetric airflow rate Q sensor 376 and a velocity V sensor 378.

The processor 356 may be configured to receive the airflow, temperature and humidity signals generated by the sensors and/or data corresponding thereto. Additionally the processor 356 may be configured to access a database with computer instructions operational thereon for processing the velocity and static pressure signals and/or data corresponding thereto thereby determining a volumetric airflow rate (Q) of the airflow. Additionally, for processing the temperature and humidity signals and/or data corresponding thereto with data from the database thereby determining a change in enthalpy (Δh) of the airflow after encountering the heat exchange element 110, and for determining the instantaneous rate of heat exchange (E) between the airflow and the heat exchange element 110.

The processor 356 may determine the rate of heat exchange (i.e. the thermal load) in any suitable manner, such as by employing the methods described. The determined thermal load may be shown on a display screen 384 or may be provided by any suitable output module.

The data, such as the sensor output and/or the rate of heat exchange, may be transmitted, via the wired communication means 362 or wireless communication means 364, to the processor 356, or to an intermediary computer or a communication device in communication with the processor 356 or another remote location for storage and/or further processing thereof.

In some embodiments the device 300 may comprise further mechanical and/or electrical components and connections.

In some embodiments, the processing by processor 356 and/or the memory storage by memory 354 is performed remotely, out of the device 300. In some embodiments external sensors, placed out of the device 300 may be provided and the sensor signals may be accessed by the device 300 through the Internet.

In some embodiments, data may be stored in a database remotely from the device 300 or stored within memory 354 of the device 300 or a computing system. The device 300 or computing system or any other database, may receive data stored on the at least one database includes performance properties of the fan 260 or a blower of the HVAC system. The stored data may include parameters for converting the velocity and/or static pressure data to the volumetric airflow rate. The database may also store thereon enthalpy data for a plurality of temperatures and humidity levels. The database may also store thereon historical data including at least one of weather, energy consumption, system operation, and system performance associated with the HVAC system 200.

Figure 4:
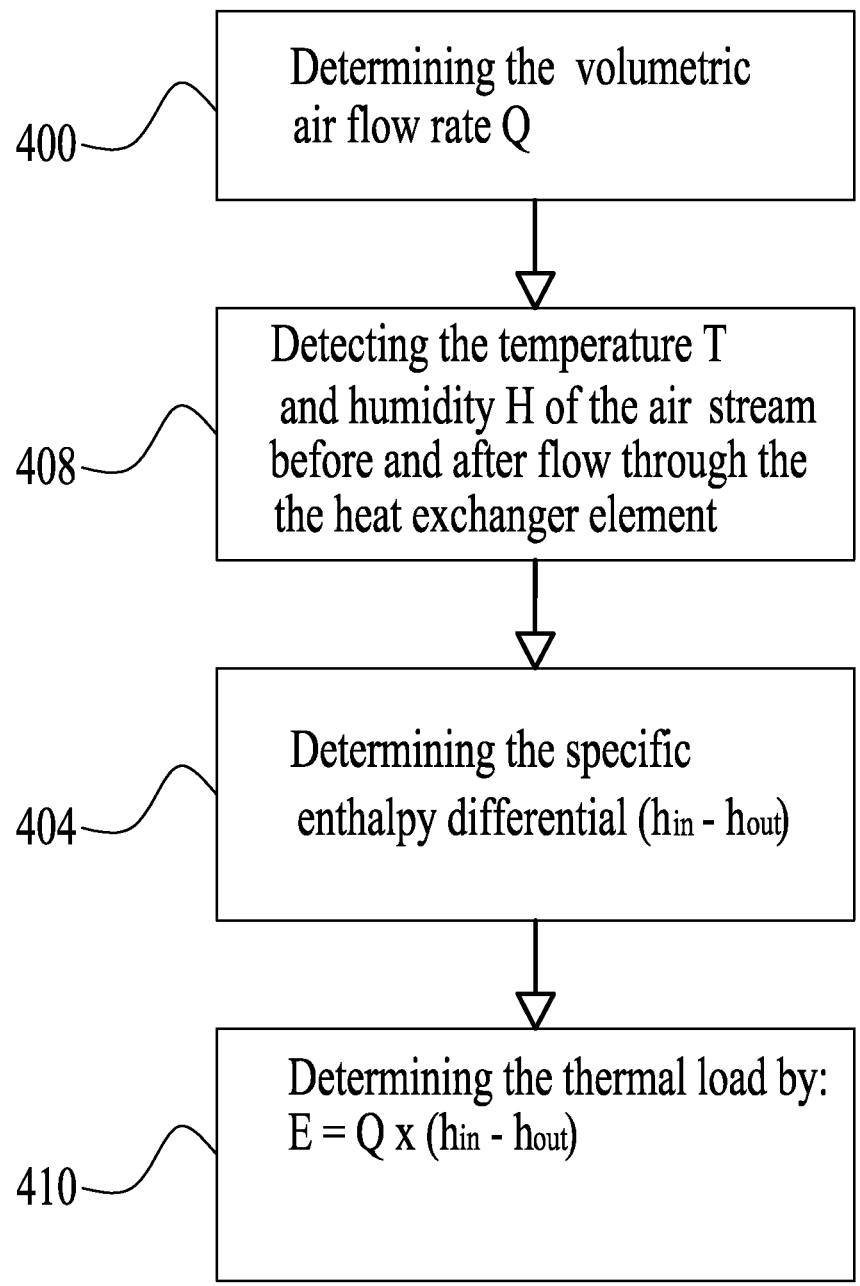
FIG. 4 is a flowchart illustrating an exemplary method for measuring a thermal load in an airflow system, according to some embodiments of the present disclosure.

FIG. 4 is a flowchart illustrating is an exemplary method for measuring a thermal load in the airflow system 100, according to some embodiments of the present disclosure.

In step 400 the volumetric airflow rate Q of an air stream in the air flow system 100 may be determined. In some embodiments, volumetric airflow rate Q may be determined directly, such as by a volumetric airflow rate Q sensor, such as volumetric airflow rate Q sensor 376 of device 300.

As described above, in some HVAC systems 200, some air flow properties of the air stream, such as incoming air 104, may change from one instant to another or may not be uniform. For example, the volumetric airflow rate Q may change constantly or the velocity V may not be uniform across the entire area A, where the velocity is being measured.

In some embodiments, the volumetric airflow rate Q may be determined indirectly. A correlation between a measurable air property or measurable air flow and the volumetric airflow rate Q may be provided. The measurable air property may comprise, for example, the air stream temperature, humidity, and/or pressure. The measurable air flow may comprise the air stream velocity. This correlation may comprise the characteristic function Q(ΔP), or characteristic curves such as the pressure-flow curve, or conversion tables, such as the V per Q conversion table or the velocity V per area A conversion table, described herein. Accordingly, the volumetric airflow rate Q can be inferred from the measurable air property/air flow and Q correlation. In some embodiments, the volumetric airflow rate Q may be determined based on the fan power.

In some embodiments, the device 300 or computing system may receive airflow data, corresponding to the velocity, and static pressure of the airflow through the heat exchange element 110 or may receive airflow data corresponding to the fan power of fan 260. The airflow data may comprise an instantaneous reading of the at least one of the velocity and static pressure.

Step 404 may comprise determining the specific enthalpy differential Δh, comprising determining $h_{in}$ of the air stream prior to flow through the heat exchange element 110, such as incoming air 104, and the specific enthalpy $h_{out}$ of the air stream after flow through the heat exchange element 110, such as the outgoing air 112. This may be determined in any suitable manner, such as by detecting the temperature T and humidity H of the air stream before and after flow of the air stream through the heat exchange element 110, as seen in step 408. The detection of the specific enthalpy may be performed in any suitable manner, such as by sensors including, for example, temperature T sensor and humidity H sensors. In some embodiments the sensors may be placed within the device 300, such as the temperature T sensor 370 and the humidity H sensor 372. In some embodiments, the sensors may be placed within the air management unit 106. In some embodiments, enthalpy after the heat exchange element 110, $h_{out}$, may be estimated obtained, received or drawn from a memory, based on the enthalpy before encountering the heat exchange element 110, $h_{in}$, and other properties of the air handling unit 206, described herein.

The specific enthalpy h may be determined in any suitable manner. In some embodiments, the enthalpy may be determined by an algorithm known in the art comprising the temperature T of the airflow and the relative humidity H of the airflow. An example of such an algorithm may comprise psychometric charts, known in the art.

In some embodiments, a database having stored thereon at least enthalpy data for a plurality of temperatures and humidity levels, may be accessed. Some of the temperature and humidity data with enthalpy data may be processed to determine the change in enthalpy (Δh) of the airflow after encountering the heat exchange element 110.

Step 410 may comprise determining the thermal load by employing the algorithm comprising $E=Q \times (h_{in}-h_{out})$, thereby determining the instantaneous rate of heat exchange between the airflow and the heat exchange element from the determined volumetric airflow rate and change in enthalpy.

The determined instantaneous heat exchange between the airflow and the heat exchange element 110 may be outputted to at least one of a database, a display, a computer, a server, a printer, and a mobile device, which may be part of device 300 or the computing system or separate therefrom.

In some embodiments, the method for measuring a thermal load in the airflow system 100 may be carried out substantially in real-time, when the airflow flows through the heat exchange element 110.

The order of the steps of FIG. 4 may be interchangeable. For example, determining the volumetric airflow rate Q in step 400 can be performed after determining the specific enthalpy differential $h_{in}-h_{out}$ in step 404.

In some embodiments, in addition or instead determining the heat exchange rate, the HVAC system 200 may be configured to provide airflow information of the airflow proximate the heat exchange element 110, and a plurality of temperature and humidity levels thereof.

The thermal load determination may be performed by a user or automatically by following a predetermined protocol setting out steps, durations and locations for performing the determination. In a non-limiting example, the protocol may comprise measuring the air flow property by placing the device 300 at the inlet 102 of FIG. 1 or at inlet 220 and/or inlet 246 of FIG. 2, for a predetermined duration and thereafter placing the device 300 at the outlet 118 of FIG. 1 or outlet 214 of FIG. 2, for a predetermined duration.

In the following description some exemplary methods are described for measuring the thermal load of the heat exchange element 110 comprising the cooling coil 264 of the air handling unit 206. It is appreciated that other methods may be used and thermal load at other locations within the HVAC system 200, may be determined.

A first exemplary method describes measuring the thermal load for conditioning the incoming air 104 by the coil 264. The incoming air 104 may be directed into the air handling unit 206 by fan 260.

The volumetric airflow rate Q may be determined by measuring the pressure differential ΔP measured by pressure sensors 302. The device 300 may detect signals emitted by the pressure sensors 302 and store detected pressure value therein. Thereafter the volumetric airflow rate Q may be found according to the characteristic function Q(ΔP) provided by the manufacturer of fan 260 and stored in the device 300.

The specific enthalpy differential Δh may be determined by determining the specific enthalpy of the incoming air 104 and the specific enthalpy of the outgoing air 112. In this first exemplary method the incoming air 104 comprises both the return air (RA) 214 and the outdoor air (OA) 240, which are introduced into the air handling unit 206. Following conditioning by the coil 264, the combined return air 214 and outdoor air 240 are provided to the interior space 212 as supply air (SA) 208.

Accordingly, the specific enthalpy of the incoming air 104, $h_{in}$, comprises the specific enthalpy of the return air (RA) 214 and the outdoor air (OA) 240 and is denoted by $h_{RA+OA}$. The specific enthalpy of the outgoing air 112 comprises the specific enthalpy of the supply air 208, and is denoted by $h_{SA}$.

The temperature and relative humidity of the incoming air 104 may be measured within the air handling unit 206 such as at a location 320 or in proximity thereto, wherein both the return air 214 and the outdoor air 240 flow prior to coil 264. The temperature and relative humidity are respectively denoted by $T_{RA+OA}$ and $H_{RA+OA}$. The specific enthalpy, $h_{RA+OA}$, may be determined by an algorithm known in the art comprising $T_{RA+OA}$ and $H_{RA+OA}$ such as by employing psychometric charts.

The temperature and relative humidity of the outgoing air 112 may be measured within the air handling unit 206 such as at a location 326, where the supply air 208 flows passed coil 264. The temperature and relative humidity are respectively denoted by $T_{SA}$ and $H_{SA}$ or wet bulb $T_{WSA}$. The specific enthalpy, $h_{SA}$, may be determined by an algorithm known in the art comprising $T_{SA}$ and $H_{SA}$ or comprising $T_{WSA}$, such as by employing psychometric charts The thermal load thus may be calculated as $$E_{RA+OA}=Q \times (h_{RA+OA}-h_{SA}).$$

A second exemplary method describes measuring the thermal load for conditioning the incoming air 104 by the coil 264. The incoming air 104 may be directed into the air handling unit 206 by fan 260.

As in the first exemplary method, the volumetric airflow rate Q may be determined by first measuring the pressure differential ΔP measured by pressure sensors 302. The device 300 may detect signals emitted by the pressure sensors 302 and store detected pressure value therein. Thereafter the volumetric airflow rate Q may be found according to the characteristic function Q(ΔP) provided by the manufacturer of fan 260 and stored in the device 300.

The specific enthalpy differential Δh may be determined by determining the specific enthalpy of the incoming air 104 and the specific enthalpy of the outgoing air 112. In this second exemplary method the HVAC system 200 may operate in an "Economizer mode" wherein all the return air 214 is exhausted and only the outdoor air 240 is introduced into the air handling unit 206. Following conditioning therein by coil 264, the outdoor air 240 is provided to the interior space 212 as supply air 208.

Accordingly, the specific enthalpy of the incoming air 104, $h_{in}$, comprises the specific enthalpy of the outdoor air (OA) 240 $h_{OA}$. The specific enthalpy of the outgoing air 112 comprises the specific enthalpy of the supply air 208 $h_{SA}$.

The temperature and relative humidity of the incoming air 104 may be measured within the air handling unit 206 such as at the location 320, wherein the outdoor air 240 flows prior to coil 264. The temperature and relative humidity are respectively denoted by $T_{OA}$ and $H_{OA}$. The specific enthalpy, $h_{OA}$, may be determined by an algorithm known in the art comprising $T_{OA}$ and $H_{OA}$ such as by employing psychometric charts.

As in the first exemplary method, the temperature and relative humidity of the outgoing air 112 may be measured within the air handling unit 206 such as at a location 326, wherein the supply air 208 flows passed coil 264. The temperature and relative humidity are respectively denoted by $T_{SA}$ and $H_{SA}$ or wet bulb $T_{WSA}$. The specific enthalpy, $h_{SA}$, may be determined by an algorithm known in the art comprising $T_{SA}$ and $H_{SA}$ or comprising $T_{WSA}$, such as by employing psychometric charts The thermal load thus may be calculated as:

$$E_{Economizer} = Q \times (h_{OA} - h_{SA}).$$

A third exemplary method describes measuring the thermal load for conditioning the incoming air 104 by the coil 264. The incoming air 104 may be directed into the air handling unit 206 by fan 260.

As in the first exemplary method, the volumetric airflow rate Q may be determined by first measuring the pressure differential $\Delta P$ measured by pressure sensors 302. The device 300 may detect signals emitted by the pressure sensors 302 and store detected pressure value therein. Thereafter the volumetric airflow rate Q may be found according to the characteristic function $Q(\Delta P)$ provided by the manufacturer of fan 260 and stored in the device 300.

The specific enthalpy differential $\Delta h$ may be determined by determining the specific enthalpy of the incoming air 104 and the specific enthalpy of the outgoing air 112. In this third exemplary method the HVAC system 200 may operate in an "Energy saving mode", where mainly the return air 214 is introduced into the air handling unit 206. Following conditioning therein by coil 264, the return air 214 is provided to the interior space 212 as supply air 208. In the energy saving mode a minimal volume of outdoor air 240 may be introduced into the air handling unit 206 and included in the supply air 208 or no volume of outdoor air 240 is introduced into the air handling unit 206.

Accordingly, the specific enthalpy of the incoming air 104 $h_{in}$ comprises the specific enthalpy of the return air (RA) 214 $h_{RA}$. The specific enthalpy of the outgoing air 112 comprises the specific enthalpy of the supply air 208 $h_{SA}$.

The temperature and relative humidity of the incoming air 104 may be measured within the air handling unit 206 such as at the location 320, wherein the return air 214 flows prior to coil 264. The temperature and relative humidity are respectively denoted by $T_{RA}$ and $H_{RA}$. The specific enthalpy, $h_{RA}$, may be determined by an algorithm known in the art comprising $T_{RA}$ and $H_{RA}$ such as by employing psychometric charts.

As in the first exemplary method, the temperature and relative humidity of the outgoing air 112 may be measured within the air handling unit 206 such as at a location 326, wherein the supply air 208 flows passed coil 264. The temperature and relative humidity are respectively denoted by $T_{SA}$ and $H_{SA}$ or wet bulb $T_{WSA}$. The specific enthalpy, $h_{SA}$, may be determined by an algorithm known in the art comprising $T_{SA}$ and $H_{SA}$ or comprising $T_{WSA}$, such as by employing psychometric charts The thermal load thus may be calculated as:

$$E_{Energy\ Saving} = Q \times (h_{RA+OA} - h_{SA}).$$

The example as set herein is meant to exemplify the various aspects of carrying out the invention and is not intended to limit the invention in any way.

In the following example a method for measuring the thermal load for conditioning the outside air 240 only by the air handling unit 206 is described utilizing the second exemplary method described above.

EXAMPLE

Experimental Procedure:
The volumetric airflow rate Q was measured resulting in Q=1000 cubic feet per minute (cfm).

The temperature and relative humidity of the outdoor air 240 were measured at location 320.

$T_{OA}$=95° F. and $H_{OA}$=80% RH (relative humidity). The enthalpy, was determined using psychrometric charts, known in the art, resulting in $h_{OA}$=54.71 Btu/lb.

The temperature and relative humidity of the supply air 208 were measured at location 326.

$T_{SA}$=66° F. and $H_{SA}$=50% RH (relative humidity). The enthalpy, was determined using psychrometric charts, known in the art, resulting in $h_{SA}$=23.22 Btu/lb.

The thermal load i.e. the heat exchange rate between the airflow and the coil 264, was calculated as:

$$E_{OA} = Q \times (h_{OA} - h_{AS}) = 1000\ [cfm] \times (54.71 - 23.22)(Btu/lb) \times 4.5 = 141{,}705\ Btu/hour.$$

The 4.5 is the conversion factor of the estimated weight in pounds of a cubic foot of air and conversion of minutes to an hour.

Communication between the computing system or device 300 and any other components of the airflow system 100, such as the HVAC system 200, may be provided in any suitable manner. In some embodiments, the communication can be wired and provided through electrical connections. In some embodiments, the communication can be wireless via an analog short range communication mode, or a digital communication mode including WIFI or BLUETOOTH®. Additional examples of such communication can include a network. The network can include a local area network ("LAN"), a wide area network ("WAN"), or a global network, for example. The network can be part of, and/or can include any suitable networking system, such as the Internet, for example, and/or an Intranet. Generally, the term "Internet" may refer to the worldwide collection of networks, gateways, routers, and computers that use Transmission Control Protocol/Internet Protocol ("TCP/IP") and/or other packet based protocols to communicate therebetween.

In some embodiments the airflow system 100 may comprise a single or plurality of transmission elements for communication between components thereof. In some embodiments, the transmission element can include at least one of the following: a wireless transponder, or a radio-frequency identification ("RFID") device. The transmission element can include at least one of the following, for example: a transmitter, a transponder, an antenna, a transducer, and/or an RLC circuit or any suitable components for detecting, processing, storing and/or transmitting a signal, such as electrical circuitry, an analog-to-digital ("A/D") converter, and/or an electrical circuit for analog or digital short range communication.

In some embodiments, any relevant components of the airflow system 100 can include a processor, a memory, a storage device, and an input/output device.

Various implementations of some of embodiments disclosed, in particular at least some of the processes discussed (or portions thereof), may be realized in digital electronic circuitry, integrated circuitry, specially configured ASICs (application specific integrated circuits), computer hardware, firmware, software, and/or combinations thereof. These various implementations, such as associated with the airflow system 100 and the components thereof, for example, may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., non-transitory mediums including, for example, magnetic discs, optical disks, flash memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a LCD (liquid crystal display) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smartphone, media player or personal data assistant ("PDA"). Other kinds of devices may be used to provide for interaction with a user as well. For example, feedback provided to the user may be any form of sensory feedback (e.g., visual feedback, auditory feedback, or tactile feedback), and input from the user may be received in any form, including acoustic, speech, or tactile input. Certain embodiments of the subject matter described herein may be implemented in a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

The components of the system may be interconnected by any form or medium of digital data communication (e.g., a communication network). Examples of communication networks include a local area network ("LAN"), a wide area network ("WAN"), and the Internet. The computing system according to some such embodiments described above may include clients and servers. A client and server are generally remote from each other and typically interact through a communication network. The relationship of client and server arises by virtue of computer programs running on the respective computers and having a client-server relation to each other.

Any and all references to publications or other documents, including but not limited to, patents, patent applications, articles, webpages, books, etc., presented anywhere in the present application, are herein incorporated by reference in their entirety.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements/features from any other disclosed methods, systems, and devices, including any and all features corresponding to translocation control. In other words, features from one and/or another disclosed embodiment may be interchangeable with features from other disclosed embodiments, which, in turn, correspond to yet other embodiments. Furthermore, one or more features/elements of disclosed embodiments may be removed and still result in patentable subject matter (and thus, resulting in yet more embodiments of the subject disclosure). Likewise, some of the embodiments of the disclosure may be patentably distinct from the prior art by not having one or more specific prior art elements/features. In other words, claims to some embodiments are patentably distinct over the prior art by reciting lack of one or more elements/features (i.e., negative limitations).

What is claimed is:

1. A non-transitory computer readable medium having stored thereon computer instructions operational on one or more processors for performing a computer implemented method for determining instantaneous heat exchange rate between an airflow and a heat exchange element of an HVAC system, comprising:

obtaining:
airflow data corresponding to at least one of a velocity and a static pressure of an airflow over and/or through a heat exchange element of an HVAC system or airflow data corresponding to a fan power of a fan within the HVAC system;
a first temperature and a first humidity level data of the airflow prior to encountering the heat exchange element; and
a second temperature and a second humidity level data of the airflow after encountering the heat exchange element;
accessing at least one database having stored thereon data including at least enthalpy data for a plurality of temperatures and humidity levels or utilizing a formula for converting temperature and humidity to enthalpy so as to determine a first enthalpy based at least partially on the first temperature and the first humidity level and a second enthalpy based at least partially on the second temperature and the second humidity level;
processing the airflow data corresponding to the at least one of the velocity and the static pressure or the fan power so as to determine a volumetric airflow rate (Q) of the airflow;
determining a change in enthalpy ($\Delta h$) of the airflow after encountering the heat exchange element based at least partially on the first enthalpy and the second enthalpy; and
determining an instantaneous rate of heat exchange (E) between the airflow and the heat exchange element based on the determined volumetric airflow rate and change in enthalpy.

2. The medium of claim 1, wherein the method further comprises outputting at least the determined instantaneous heat exchange rate between the airflow and the heat exchange element to at least one of a database, a display, a computer, a server, a printer, and a mobile device.

3. The medium of claim 1, wherein at least one of the obtaining, accessing, processing and determining steps are carried out substantially in real-time.

4. The medium of claim 1, wherein obtaining comprises receiving the airflow data via at least one of wired or wireless communication.

5. The medium of claim 1, wherein the airflow data comprises an instantaneous reading of the at least one of the velocity and static pressure.

6. The medium of claim 1, wherein the data stored on the at least one database includes performance properties of the fan or a blower of the HVAC system.

7. The medium of claim 6, wherein the data stored on the at least one database includes parameters for converting at least one of velocity and static pressure data to a volumetric flow rate specific to the HVAC system.

8. The medium of claim 1, wherein the data stored on the at least one database includes historical data including at least one of weather, energy consumption, system operation, and system performance associated with the HVAC system.

9. A system for determining instantaneous heat exchange rate between an airflow and a heat exchange element of an HVAC system, the system comprising:
  an HVAC system comprising:
  an air handling unit configured to receive and effect heat exchange via a heat exchange element on an airflow at least partially received from an interior space and return the airflow after heat exchange to the interior space;
  the heat exchange element;
  at least one airflow sensor arranged proximate the heat exchange element and configured to generate at least one of a velocity signal and a static pressure signal determinative of at least one of a velocity and a static pressure, respectively, of an airflow over and/or through the heat exchange element;
  a first temperature sensor and a first humidity sensor arranged proximate the heat exchange element on an upstream side thereof, each first temperature and first humidity sensor configured to generate respective first signals determinative of a first temperature and a first humidity level, respectively, of the airflow prior to encountering the heat exchange element; and
  a second temperature sensor and a second humidity sensor arranged proximate the heat exchange element on a downstream side thereof, each second temperature and second humidity sensor configured to generate respective second signals determinative of a second temperature and a second humidity level, respectively, of an airflow after encountering the heat exchange element;
  at least one database having stored thereon data including at least enthalpy data for a plurality of temperatures and humidity levels;
  at least one computer processor which is configured:
    to obtain the at least one of a velocity signal and a static pressure signal, the first signals and the second signals generated by the sensors, and/or the at least one of the velocity and the static pressure, the first temperature and the first humidity level, and the second temperature and the second humidity level corresponding thereto,
    to access the at least one database, and the at least one computer processor having computer instructions operational thereon for:
      processing the at least one of the velocity signal and the static pressure signal, and/or the at least one of the velocity and the static pressure corresponding thereto so as to determine a volumetric airflow rate (Q) of the airflow;
      processing the first signals and the second signals and/or the first temperature and the first humidity level, and the second temperature and the second humidity level corresponding thereto with the enthalpy data from the database so as to determine a change in enthalpy ($\Delta h$) of the airflow after encountering the heat exchange element; and
      determining the instantaneous rate of heat exchange (E) between the airflow and the heat exchange element based on the determined volumetric airflow rate and change in enthalpy.

10. The system of claim 9, wherein the computer instructions are further operational to output at least the determined instantaneous heat exchange rate between the airflow and the heat exchange element to at least one of a database, a display, a computer, a server, a printer, and a mobile device.

11. The system of claim 9, wherein at least one of the obtaining, the accessing, the processing and the determining steps are performed substantially in real-time.

12. The system of claim 9, wherein the at least one of the velocity signal and the static pressure signal generated from the air flow sensor comprises an instantaneous reading of the velocity and/or static pressure.

13. The system of claim 9, wherein one or more of the at least one airflow sensor, the first temperature sensor, the first humidity sensor, the first temperature sensor and the first humidity sensor are configured to provide corresponding generated signals via at least one of wire or wireless communications to the processor or to an intermediary computer or a communication device in communication with the processor.

14. The system of claim 9, wherein the processor comprises at least one remote computer.

15. The system of claim 9, wherein the HVAC system includes a blower or a fan, and wherein the data stored on the at least one database includes performance properties of the blower or the fan.

16. The system of claim 15, wherein the performance properties of the fan or the blower comprises a characteristic pressure-volumetric airflow rate curve of the fan or the blower.

17. The system of claim 9, wherein the data stored on the at least one database includes parameters for converting the at least one of the velocity signal and the static pressure signal to the volumetric flow rate specific to the HVAC system.

18. The system of claim 9, wherein the data stored on the at least one database includes historical data including at least one of weather, energy consumption, system operation, and system performance associated with the HVAC system.

19. A computer implemented method for presenting to a user a value representing an instantaneous rate of heat exchange (E) between an airflow and a heat exchange element of an HVAC system, comprising:
  obtaining by a computer readable medium:
    airflow data corresponding to at least one of a velocity and a static pressure of an airflow over and/or through a heat exchange element of a HVAC system or airflow data corresponding to a fan power of a fan within the HVAC system;

a first temperature and a first humidity level data of the airflow prior to encountering the heat exchange element; and a second temperature and a second humidity level data of the airflow after encountering the heat exchange element;

accessing at least one database having stored thereon data including at least enthalpy data for a plurality of temperatures and humidity levels or utilizing a formula for converting temperature and humidity to enthalpy so as to determine a first enthalpy based at least partially on the first temperature and the first humidity level and a second enthalpy based at least partially on the second temperature and the second humidity level;

processing the airflow data corresponding to the at least one of the velocity and the static pressure or the fan power so as to determine a volumetric airflow rate (Q) of the airflow;

determining a change in enthalpy (Δh) of the airflow after encountering the heat exchange element based at least partially on the first enthalpy and the second enthalpy;

determining an instantaneous rate of heat exchange (E) between the airflow and the heat exchange element based on the determined volumetric airflow rate and change in enthalpy; and displaying the value representing the instantaneous rate of heat exchange (E) in a graphical user interface.

20. An evaluation method for evaluating energy efficiency of an HVAC system, comprising:

performing steps of claim 19 so as to generate a first value representing an instantaneous rate of heat exchange (E) for a HVAC system employing an improved energy utilization practice;

performing steps of claim 19 so as to generate a second value representing an instantaneous rate of heat exchange (E) for a HVAC system lacking an improved energy utilization practice;

performing a comparison of the first value and the second value so as to generate a third value representing an energy efficiency of the HVAC system; and displaying the third value in the graphical user interface.

* * * * *